UNITED STATES PATENT OFFICE.

BENIGNO GUTIERREZ, OF SANTA BARBARA, CALIFORNIA.

IMPROVEMENT IN MEDICAL COMPOUNDS.

Specification forming part of Letters Patent No. 118,714, dated September 5, 1871.

*To all whom it may concern:*

Be it known that I, BENIGNO GUTIERREZ, of Santa Barbara, in the county of Santa Barbara and State of California, have invented or discovered an Improved Medical Compound, which I call "Tonico Benigno," an effectual remedy for all impurities of the blood, scrofula, &c.; and I do hereby declare that the following is a full description of the ingredients employed, and the manner of mixing and compounding them to make the said compound, together with the manner of using the same.

In certain localities of the Pacific coast there grows an indigenous herb, called by the native Californians "rosilla," which, upon experimenting with, I have discovered to be a sovereign remedy for all diseases arising from an impure condition of the blood, including scrofulous and other blood and bone diseases. The plant or herb is an annual, and grows in low moist places. The flower is a reddish yellow, ball-shaped, and composed of numerous small flowerets in a disk, and belongs to the numerous order of compound flowers, such as the sunflower or dandelion, and so far as my knowledge extends has never been botanically described.

Of this herb or flower in a dried condition I take two drams; buchu and senna leaves, each one-half ounce; and steep the whole, after the manner of preparing herbs, in eight ounces of distilled water. When cold, I add eight ounces of California brandy, and macerate seven days, then strain, filter, and bottle for use. Dose for an adult, one table-spoonful three times a day.

The senna and buchu leaves are not essential to render the herb efficacious, but may be considered principally as a vehicle for administering it.

An infusion of the herb in distilled water and sweetened with a little honey or sugar, I have found to have the same beneficial effect, especially if the patient is first purged with a light cathartic; consequently I do not wish to confine myself strictly to the above formula; but What I do claim, and desire to secure by Letters Patent, is—

An infusion of the within-described and named herb in any vehicle suitable for administering it to the patient, substantially as and for the purpose set forth.

In witness whereof I have hereunto set my hand and seal.

BENIGNO GUTIERREZ. [L. S.]

Witnesses:
C. W. M. SMITH,
WM. J. CAMPBELL.